United States Patent
Noguchi

[11] 3,922,059
[45] Nov. 25, 1975

[54] METHOD OF CONVERTING CIRCULAR SCANNING LINES INTO LINEAR SCANNING LINES

[75] Inventor: Masaru Noguchi, Asaka, Japan

[73] Assignee: Fuji Photo Film Co., Ltd., Minami-ashigara, Japan

[22] Filed: Oct. 3, 1974

[21] Appl. No.: 511,652

[30] Foreign Application Priority Data
Oct. 4, 1973   Japan............................ 48-111770

[52] U.S. Cl. ................. 350/3.5; 178/7.6; 346/108; 350/7
[51] Int. Cl.² ...................... G03H 1/04; G02B 5/32
[58] Field of Search ................ 350/3.5, 7; 346/108; 178/6.7 R, 7.6

[56] References Cited
UNITED STATES PATENTS
3,630,594   12/1971   Gorog.................................. 350/3.5

Primary Examiner—Ronald J. Stern
Attorney, Agent, or Firm—Fleit & Jacobson

[57] ABSTRACT

A hologram which has a function to deflect a beam forming a circular scanning line to make it form a linear scanning line is located at a position to receive the light beam from a device which emits a beam forming a circular scanning line. The hologram is prepared by making interference between a collimated beam and a converging beam having an annular cross section.

5 Claims, 7 Drawing Figures

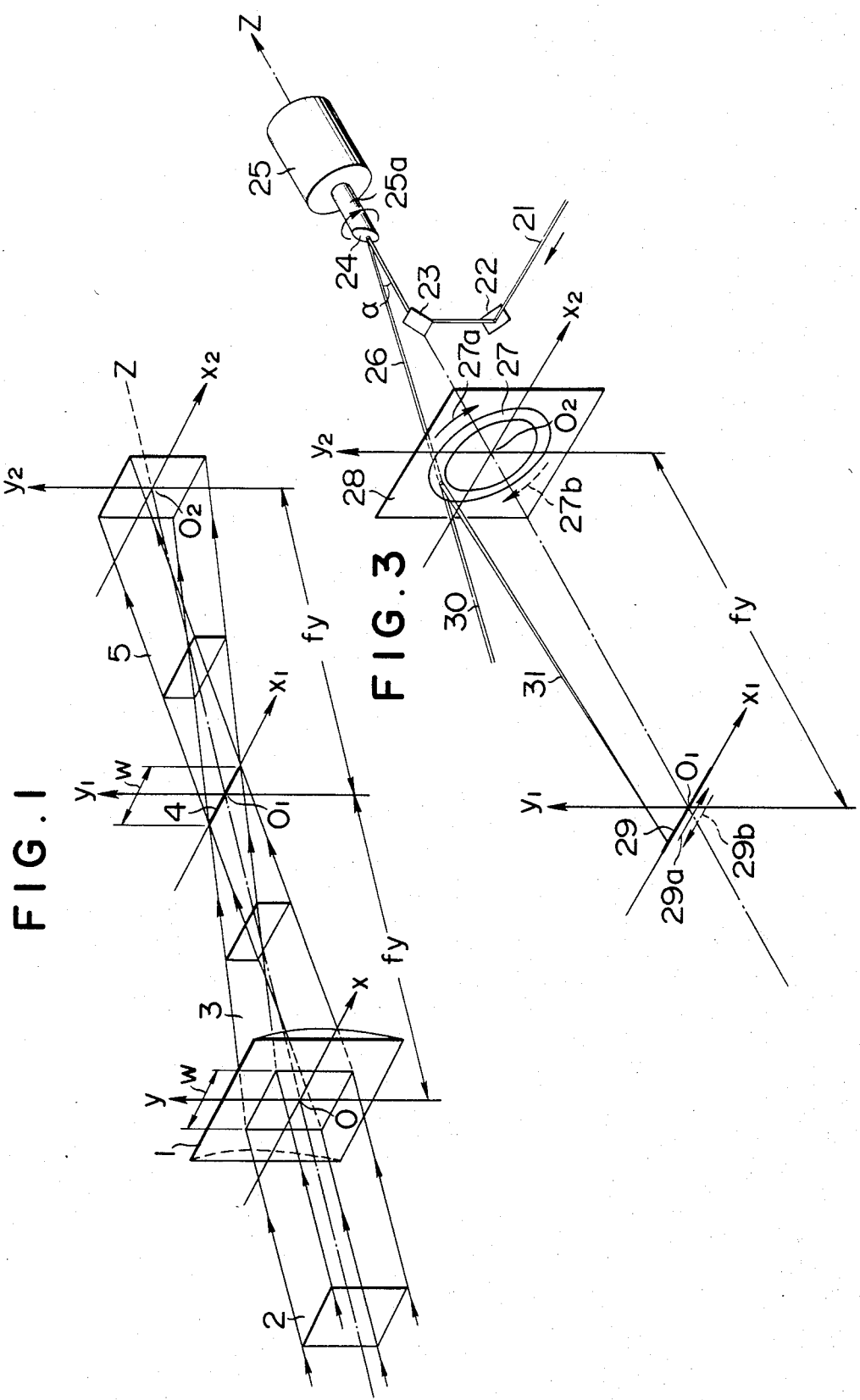

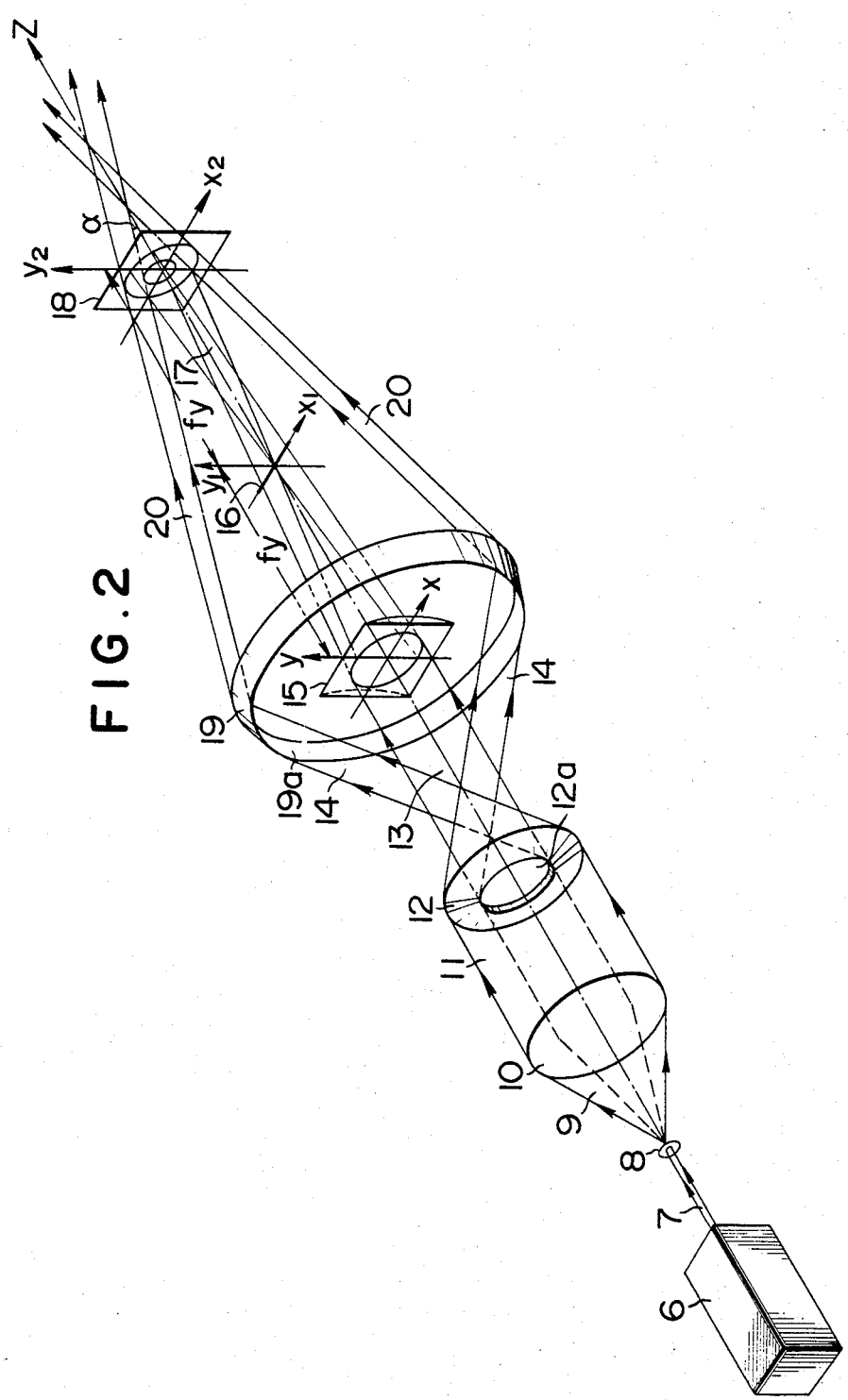

METHOD OF CONVERTING CIRCULAR SCANNING LINES INTO LINEAR SCANNING LINES

BACKGROUND OF THE INVENTION

1. Field of the Invention

This invention relates to a method of converting a circular scanning line into a linear scanning line, and more particularly to a method of optically converting circular scanning into linear scanning by use of a hologram.

2. Description of the Prior Art

It has been known in the art to display images on a cathode ray tube or to record images on a photosensitive material by use of a modulated scanning beam such as a laser beam. In the scanning system, a light beam deflector is used to deflect the beam repeatedly in parallel lines. As for the light beam deflector, there are known a beam deflector employing an electro-optic effect, a beam delector employing an acousto-optic effect, a beam deflector using a rotary polyhedral mirror or prism and a beam deflector using an electromagnetic type vibrating mirror or an electromagnetic resonance type vibrating mirror such as a galvanometer.

The light beam deflectors employing the electro-optic effect or the acousto-optic effect are costly and disadvantageous in that the angle of deflection cannot be made large. Further, the resolution of the image obtained thereby is lowered when the scanning is performed at a high speed.

The light beam deflector using a rotary polyhedral mirror is disadvantageous in that the manufacture thereof is very difficult. The faces of the polyhedral mirror must be precisely parallel to each other. The angles formed between adjacent faces must be precisely equal to each other and the surface of the faces must be as smooth and flat as possible.

Although the light beam deflector using a vibrating mirror is economically advantageous, it is unsuitable for a high speed scanning system since a number of mirrors of extremely small size are required when the scanning is conducted at a high speed.

SUMMARY OF THE INVENTION

In the light of the foregoing observations and description, it is the primary object of the present invention to provide a method of obtaining parallel straight scanning lines by use of a circular scanning system which is comparatively simple in construction.

Another object of the present invention is to provide a method of obtaining parallel straight scanning lines at a high speed.

The method of obtaining straight scanning lines in accordance with the present invention employs a circular scanning system and converts circular scanning lines obtained thereby into straight scanning lines by use of a hologram.

Still another object of the present invention is to provide a highly accurate method of obtaining parallel straight scanning lines at a low cost.

By using a circular scanning system, the overall construction of the apparatus for making parallel straight scanning lines is much simplified. A system for making circular scanning lines can be made easily and it is simple to make the performance thereof accurate. In accordance with the present invention, circular scanning lines are first made by use of a circular scanning system and then the circular scanning lines are converted to parallel straight lines.

For converting the circular scanning lines into parallel straight scanning lines, a hologram is used. The function of the hologram is to receive a scanning light beam forming circular scanning lines and to deflect the scanning light beam to make it form linear scanning lines on a plane.

The hologram is located at a position to receive the circular scanning line forming beam from a device for making circular scanning lines. The distance between the hologram and the device for making circular scanning lines need not be so accurately determined since there is an allowance in the position of the hologram with respect to the device. The design of the scanning system is therefore facilitated. This is a great advantage of the present invention. Another advantage of the present invention is that the hologram used in this system can simply be duplicated either by the optical contact printing method or by stamping a plastic material such as vinylchloride.

The system for making circular scanning lines is made, for instance, by obliquely cutting the rotary shaft of a motor and mounting a mirror to the cut end thereof or by simply mounting a prism to the shaft of a motor. The circular scanning line forming system is preferably driven by sine wave A.C. voltage. Since the above-described system using a motor can easily be made and the motor can easily be driven at a high speed, the scanning speed can easily be raised to a substantial extent. The hologram used for converting the circular scanning lines into linear scanning lines can easily be made by use of a holographic recording system.

BRIEF DESCRIPTION OF THE DRAWING

FIG. 1 is a perspective representation of an optical system which shows the convergence and divergence of a collimated beam effected by a cylindrical lens, FIG. 2 is a perspective view of an embodiment of an optical system for making a hologram used in the scanning line converting system in accordance with the present invention, FIG. 3 is a perspective view which shows the method of converting a circular scanning line into a linear scanning line in accordance with the principle of the present invention.

PREFERRED EMBODIMENTS OF THE INVENTION

Figure 4A:
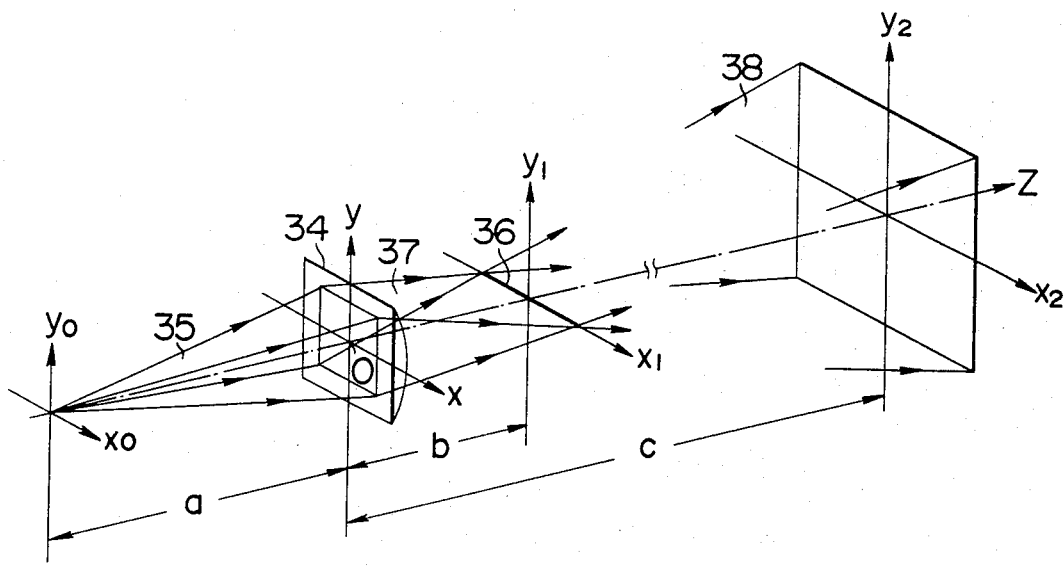
FIG. 4a is a perspective view showing an example of an optical system for forming an image of a straight line segment which is used in the present invention.

FIG. 1 shows an optical system for converging a collimated beam by use of a cylindrical lens, and FIG. shows an optical system for making a hologram which converts a circular scanning line into a linear scanning line.

Referring to FIG. 1, a positive cylindrical lens 1 is provided in the optical path of a collimated light beam 2 so that the light beam 2 may become normally incident to the cylindrical lens 1. The cylindrical lens 1 is provided so that the longitudinal axis thereof is horizontally oriented (This axis will be referred to as $x$-axis hereinbelow.) and accordingly the $y$-axis normal thereto in the direction of which only the light beam passing through the lens 1 is converged is vertically oriented. The $z$-axis normal both to the $x$ and $y$ axes is accordingly oriented horizontally in the direction of advancement of the light beam 2. The light beam 2 is vertically converged by the cylindrical lens 1 as indicated by the reference numeral 3 and a horizontally extending linear real image segment 4 is formed on a focal plane $x_1-y_1$ behind the cylindrical lens 1. The linear real image segment 4 extends on the $x_1$-axis and the length thereof is equal to the width or diameter of the collimated light beam 2 measured in the direction of the $x$-axis. The light beam 3 converged to a flat beam passing through the focal plane $x_1-y_1$ vertically diverges as it advances behind the focal plane $x_1-y_1$ and the cross section thereof becomes the same as that of the collimated beam 2 when the beam reaches a plane $x_2-y_2$ which is at the same distance from the first focal plane $x_1-y_1$ as that between the cylindrical lens 1 and the focal plane $x_1-y_1$, that is the focal length $fy$ of the cylindrical lens 1.

An optical system for making a hologram which converts a circular scanning line into a linear scanning line in which the above described optical system employing a cylindrical lens as shown in FIG. 1 is used as a part is illustrated in FIG. 2. Referring to FIG. 2, a monochromatic light source 6 emits a collimated light beam 7 which is monochromatic and spatially coherent. In the optical path of the light beam 7 emitted by the light source 6 is provided a convex lens 8 having great refractive power such as an objective lens of a microscope to make the light beam passing therethrough diverge as indicated by the reference numeral 9. A collimator 10 is located in the optical path of the diverging beam 9 to collimate the light beam as indicated by the reference numeral 11. In the optical path of the collimated beam 11 is located a cone prism 12 the central part of which is concentrically cut away as indicated by the reference numeral 12a with the axis thereof oriented to be in alignment with the optical axis of the collimator lens 10 so that the collimated light beam 11 is divided into a collimated light beam 13 passing straight through the circular cut away hole 12a of the cone prism 12 and an annular conically diverging light beam 14. The collimated light beam 13 is vertically converged through a cylindrical lens 15 which is equivalent to the cylindrical lens 1 shown in FIG. 1 and forms a horizontally extending linear image segment 16 on a focal plane $x_1-y_1$ which is at the distance of $fy$ from the cylindrical lens 15. The distance $fy$ is the focal length of the cylindrical lens 15. The vertically converging light beam forming the linear real image segment 16 vertically diverges as indicated by 17 and impinges on a holographic recording medium 18 located on a plane $x_2-y_2$ which is at the distance of $fy$ from the first focal plane $x_1-y_1$. The vertically diverging light beam 17 has a circular cross section on the plane $x_2-y_2$, i.e. on the holographic recording medium 18. On the other hand, the conically diverging light beam 14 is conically converged by means of an internal reflection type conical mirror 19 the internal surface 19a of which reflects the light toward the holographic recording medium 18. The light beam reflected by the conical mirror 19 and conically converging as indicated by the reference numeral 20 impinges on the holographic recording medium 18. Said vertically diverging light beam 17 and the conically converging light beam 20 form a circular interference pattern on the plane $x_2-y_2$ and a hologram is recorded thereby on the holographic recording medium 18 in a circular holographic pattern.

FIG. 3 illustrates the mode of conversion of a circular scanning line into a linear scanning line by use of a hologram obtained by the method as shown in FIG. 2. A collimated laser beam 21 having a small diameter 21 is reflected by total reflection mirrors 22 and 23 and directed toward a rotary mirror 24 formed on the obliquely cut end of a rotary shaft 25a of a motor 25 in the direction of the axis of revolution of the rotary shaft 25a. The laser beam is then reflected by the rotary mirror 24. The angle of reflection $\alpha$ is made to be equal to the angle $\alpha$ formed between the $z$-axis and the conically converging light beam 20 in the optical arrangement shown in FIG. 2. The laser beam 26 reflected by the rotary mirror 24 forms a circular scanning line 27 on a hologram 28 which is oriented to be on a plane normal to the axis of revolution of the rotary shaft 25a of the motor 25 as the rotary shaft 25a rotates. As shown in FIG. 3, the axis of revolution of the rotary shaft 25a of the motor 25 is designated as the $z$-axis and the plane on which the hologram 28 is located is designated as plane $x_2-y_2$. The hologram 28 used here is the hologram recorded on the holographic recording medium 18 by the method as shown in FIG. 2. The hologram 28 is so located that the circular scanning line 27 formed thereon will become incident to the circular holographic pattern recorded thereon. Therefore, the laser beam 26 impinging on the hologram 28 is deflected thereby to form a real image of a linear segment as indicated by 29 on a plane $x_1-y_1$ which is at the distance of $fy$ from the hologram 28. As shown in FIG. 3, the laser beam 26 impinging on the hologram 28 is divided into a zero-order diffracted beam 30 and a first-order diffracted beam 31. The first-order diffracted beam 31 forms the linear image segment 29 extending in the direction of the $x_1$-axis. In more detail, as the scanning laser beam 26 reflected by the rotary mirror 24 scans the upper semi-circle of the circular scanning line 27 as indicated by the arrow of solid line 27a, the first-order diffracted beam 31 scans the horizontal straight scanning line segment 29 in one direction as indicated by the arrow of solid line 29a. Then, as the laser beam 26 scans the lower semi-circle of the circular scanning line 27 as indicated by the broken line arrow 27b, the first-order diffracted beam 31 scans the straight line segment 29 in the opposite direction as indicated by the broken line arrow 29b. The length of the straight scanning line segment 29 is equal to the diameter of the circular scanning line 27 formed on the hologram 28. In order to obtain high resolution on the scanning line 29 by making the width of the straight scanning line 29 small, it is necessary to make the diameter of the laser beam 26 reflected by the mirror 24 small. For instance, when the diameter of the circular scanning line 27, that is the length of the straight scanning line 29, is 100mm and the resolution on the scanning line is desired to be 500 points per one segment, the diameter $d$ of the laser beam 26 is to be 0.2mm as derived from the following formula;

$d = 100mm/500 = 0.2mm.$

The scanning speed of the scanning light beam 31 forming a straight scanning line segment 29 on the plane $x_1-y_1$ is not constant but a function of a sine wave as readily understood by those skilled in the art from the description made hereinabove and the drawing as shown in FIG. 1 explaining the method of conversion of the circular scanning line into the linear scanning line. Therefore, the mode of linear scanning obtained in accordance with the present invention is quite the same as that obtained in accordance with the conventional scanning system using a galvanometer driven by a sine wave power source.

Although the coherent beam used for forming a linear real image in the hologram making process in the above described embodiment of the invention is collimated, it should be understood that the coherent beam used therefor need not be collimated. For instance, a converging beam or a diverging beam can also be used for forming a linear image segment in the hologram making process.

Figure 4B:
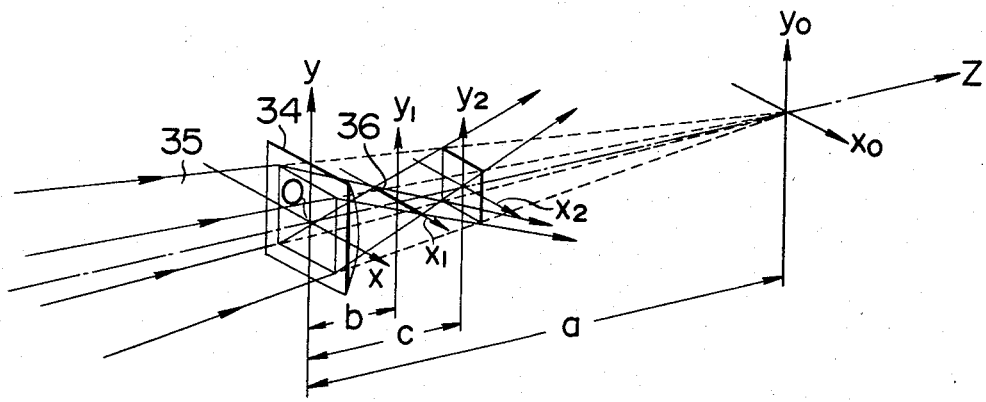
FIG. 4b is a perspective view showing another example of the optical system for forming an image of a straight line segment which is used in the present invention.

An example of the optical system for forming a linear image segment using a diverging coherent light beam is illustrated in FIG. 4a and an example of the optical system for forming a linear image segment using a converging coherent light beam is illustrated in FIG. 4b.

Now referring to FIG. 4a, a cylindrical lens 34 which only vertically converges light passing therethrough is located on a plane $x-y$. A diverging coherent light beam 35 which diverges from a point on a plane $x_0-y_0$ is vertically converged by the cylindrical lens 34 to form a horizontally extending linear image segment 36 on a plane $x_1-y_1$. The converging beam 37 forming the linear image segment 36 then vertically diverges as indicated by 38. The shape of the cross section of the diverging beam 38 becomes similar to that of the diverging beam 35 on a plane $x_2-y_2$. The relation between the positions of these planes $x_0-y_0$, $x-y$, $x_1-y_1$ and $x_2-y_2$ can be represented as follows;

$1/a + 1/b = 1/fy \quad (fy > 0)$ (1).
$c = 2ab/(a-b)$ (2).

where $a$ is the distance between the plane $x-y$ and the plane $x_0-y_0$, $b$ is the distance between the plane $x-y$ and the plane $x_1-y_1$, $c$ is the distance between the plane $x-y$ and the plane $x_2-y_2$, and $fy$ is the focal length of the cylindrical lens 34 located on the plane $x-y$. Since the distance $c$ between the plane $x-y$ and the plane $x_2-y_2$ must be positive, which means that the plane $x_2-y_2$ must be located behind the cylindrical lens 34 when viewed from the light source of the diverging beam 35, the following formula must be satisfied;

$c > 0.$ (3).

From the formulae (1), (2) and (3), $c = 2ab/(a-b) = 2afy/(a-2fy) > 0$ (4).

In order to satisfy the above formula (4), either of the following conditions must be satisfied;

$a > 2fy$ (5).
$a < 0$ (6).

The formula (5) is generally illusted by FIG. 4a. A special example thereof where $a = \infty$ is the example shown in FIGS. 1 and 2 in which the beam incident to the cylindrical lens is collimated. The formula (6) means that the beam 35 incident to the cylindrical lens 34 is converging as illustrated in FIG. 4b. In this embodiment, the beam 35 converging to a point on a plane $x_0-y_0$ which is at the distance of $a$ from the cylindrical lens 34 is vertically converged to a horizontal linear image segment 36 on a plane $x_1-y_1$ which is at the distance of $b$ from the cylindrical lens 34 and vertically diverges to form a cross section of the same shape in reduced scale as that of the cross section of the beam passing through the cylindrical lens 34 on another plane $x_2-y_2$ which is at the distance of $c$ from the cylindrical lens 34.

Figure 5A:
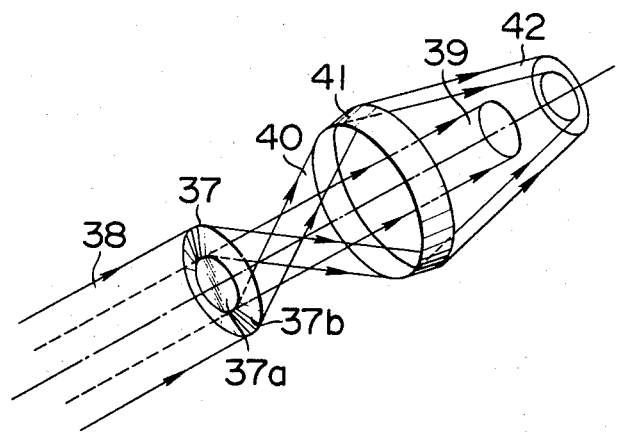
FIG. 5a is a perspective view showing an example of an optical system for forming a light beam having an annular cross section which is used in the present invention.

The conically diverging beam having an annular cross section used for forming said hologram can be produced by use of optical elements which are different from the cone prism 12 having a concentric hole 12a used in said embodiment shown in FIG. 2. One example of such optical elements is shown in FIG. 5a. The optical element 37 shown in FIG. 5a used for this purpose is a prism having a frusto-conical shape. The collimated beam 38 incident thereto is divided into a collimated beam 39 of a smaller diameter passing straight through the flat central part 37a of the prism 37 and a converging and then diverging beam 40 having an annular cross section refracted by the conical part 37b of the prism 37. The conically diverging light beam 40 is reflected by an internal reflection type conical mirror 41 and converges as indicated by 42. The converging light beam 42 having an annular cross section and the collimated light beam 39 form an interference pattern on a holographic recording medium and make a hologram.

Figure 5B:
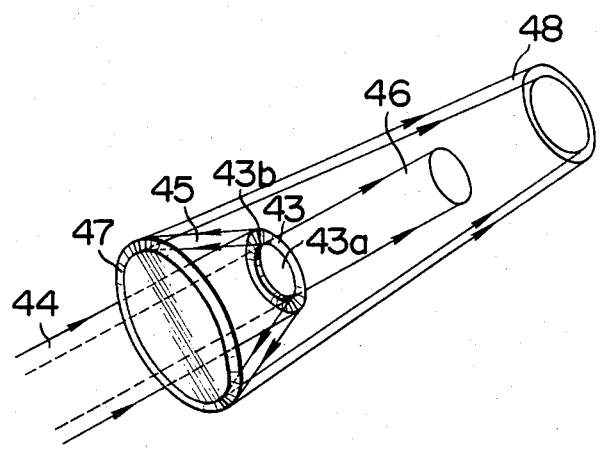
FIG. 5b is a perspective view showing another example of an optical system for forming a light beam having an annular cross section used in the present invention

Another example of the optical element used for producing the conically diverging beam having an annular cross section is shown in FIG. 5b. The optical element 43 shown in FIG. 5b used for this purpose is a conical mirror having a concentric hole 43a (which may be a concentric flat transparent part). The mirror 43 has an annular conical surface 43b surrounding the hole (or the flat transparent part) 43a to reflect the beam 44 incident thereto obliquely backward in the diverging direction as indicated by 45. The beam 44 passes straight through the hole (or the flat transparent part) 43a of the mirror 43 as indicated by 46. The diverging beam 45 having an annular cross section reflected obliquely backward is reflected forward by a conical mirror 47 and converges as indicated by 48. The collimated beam 46 and the converging beam 48 make a hologram.

In the process for making the hologram, it will be understood that the two beams for forming an interference pattern on the holographic recording medium need not be given from the same side of the medium as in the foregoing embodiments but may be given from opposite sides thereof. Such a type of the hologram is known as Lippmann type reflection hologram.

I claim:

1. A method of forming a linear scanning line on a plane comprising steps of preparing a hologram which vertically converges a conically diverging beam having an annular cross section incident thereto to make it converge to a straight horizontal line on a plane separated from the hologram by a predetermined distance, producing a collimated coherent light beam, directing said coherent light beam to a circular scanning means including a beam deflecting means which deflects the light beam incident to a point therein to make it advance from said point in diverging directions and form a circular scanning line on a plane faced normally to the beam deflecting means, and forming a circular scanning line by said beam deflecting means on said hologram, thereby forming a linear scanning line on a plane separated from the hologram by said predetermined distance.

2. A method of forming a linear scanning line as defined in claim 1 wherein said hologram preparing step comprises exposing a holographic recording medium to a converging coherent light beam having an annular cross section and a collimated coherent light beam having a cross section large enough to cover the annular cross section of said converging light beam on the holographic recording medium, said collimated light beam being coherent with said converging light beam.

3. A method of forming a linear scanning line as defined in claim 2 wherein said converging coherent light beam having an annular cross section and said collimated coherent light beam are made by passing a collimated light beam through a frusto-conical prism to divide the collimated light beam into a collimated light beam of smaller diameter and a diverging light beam having an annular cross section, and then converging the diverging light beam by use of a conical mirror of internal reflection type.

4. A method of forming a linear scanning line as defined in claim 2 wherein said converging coherent light beam having an annular cross section and said collimated coherent light beam are made by making a collimated light beam impinge upon an annular conical mirror of external reflection type to divide the collimated light beam into a collimated light beam of smaller diameter passing through the central hole thereof and a diverging light beam having an annular cross section reflected by the conical mirror, an then converging the diverging light beam by use of a conical mirror of internal reflection type.

5. A method of forming a linear scanning line as defined in claim 1 wherein said beam deflecting means comprises a rotary mirror which is formed on an obliquely cut end of a shaft of a motor, and said coherent light beam is directed to the mirror in the direction of the axis of revolution of the shaft.

* * * * *